United States Patent
Asakura et al.

(10) Patent No.: US 11,082,617 B2
(45) Date of Patent: Aug. 3, 2021

(54) ELECTRONIC DEVICE INCLUDING POWER SUPPLY AND METHOD TO BE EXECUTED BY ELECTRONIC DEVICE INCLUDING POWER SUPPLY

(71) Applicants: Naoto Asakura, Tokyo (JP); Yoshitaka Kimura, Tokyo (JP); Teruyuki Takei, Tokyo (JP); Takahiro Suzuki, Tokyo (JP)

(72) Inventors: Naoto Asakura, Tokyo (JP); Yoshitaka Kimura, Tokyo (JP); Teruyuki Takei, Tokyo (JP); Takahiro Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/353,765

(22) Filed: Mar. 14, 2019

(65) Prior Publication Data

US 2019/0289211 A1    Sep. 19, 2019

(30) Foreign Application Priority Data

Mar. 15, 2018  (JP) .............................. JP2018-048529
Mar. 5, 2019   (JP) .............................. JP2019-039154

(51) Int. Cl.
    *H04N 5/232*   (2006.01)
    *H04N 5/369*   (2011.01)

(52) U.S. Cl.
    CPC ..... *H04N 5/23241* (2013.01); *H04N 5/23245* (2013.01); *H04N 5/3698* (2013.01)

(58) Field of Classification Search
    CPC ........... H04N 5/23241; H04N 5/23245; H04N 5/3698; G06F 1/263
    See application file for complete search history.

(56) References Cited

U.S. PATENT DOCUMENTS

| | | | |
|---|---|---|---|
| 2007/0022311 A1* | 1/2007 | Park | G06F 1/266 713/310 |
| 2011/0016333 A1* | 1/2011 | Scott | G06F 1/266 713/300 |
| 2012/0019193 A1* | 1/2012 | Yu | G06F 1/28 320/103 |
| 2012/0044405 A1 | 2/2012 | Kimura et al. | |
| 2012/0086824 A1 | 4/2012 | Asakura et al. | |
| 2013/0031398 A1* | 1/2013 | Srivastava | G06F 1/26 713/340 |
| 2013/0057716 A1 | 3/2013 | Asakura | |

(Continued)

FOREIGN PATENT DOCUMENTS

| | | |
|---|---|---|
| JP | 2018-007451 | 1/2018 |
| JP | 2018-143016 | 9/2018 |

*Primary Examiner* — Sinh Tran
*Assistant Examiner* — Zhenzhen Wu
(74) *Attorney, Agent, or Firm* — Oblon, McClelland, Maier & Neustadt, L.L.P.

(57) ABSTRACT

An electronic device includes a power supply and a power supply circuit. The power supply circuit is configured to alternately switch a state of the electronic device between a first state to supply power to another device and a second state to receive power from said another device, and stop a switching operation of the state of the electronic device when the electronic device is off, to fix the state of the electronic device to one of the first state and the second state.

10 Claims, 5 Drawing Sheets

(56) References Cited

U.S. PATENT DOCUMENTS

| | | | |
|---|---|---|---|
| 2013/0134923 A1* | 5/2013 | Smith | H02J 50/10 |
| | | | 320/103 |
| 2013/0201390 A1 | 8/2013 | Asakura et al. | |
| 2015/0280478 A1* | 10/2015 | Nonogaki | H02J 7/007 |
| | | | 320/103 |
| 2016/0216757 A1* | 7/2016 | Kim | G06F 1/266 |
| 2017/0163074 A1 | 6/2017 | Kimura | |
| 2018/0004277 A1* | 1/2018 | Matsui | G06F 1/3287 |
| 2018/0070034 A1 | 3/2018 | Kimura | |
| 2018/0181177 A1* | 6/2018 | Fukute | H04N 1/00907 |
| 2018/0241926 A1 | 8/2018 | Nishimura et al. | |
| 2018/0292880 A1* | 10/2018 | Nakadokoro | G06F 1/266 |
| 2019/0165428 A1* | 5/2019 | Nozaki | H01M 10/44 |
| 2019/0294228 A1* | 9/2019 | Tamura | G06F 1/26 |

* cited by examiner

ELECTRONIC DEVICE INCLUDING POWER SUPPLY AND METHOD TO BE EXECUTED BY ELECTRONIC DEVICE INCLUDING POWER SUPPLY

CROSS-REFERENCE TO RELATED APPLICATIONS

This patent application is based on and claims priority pursuant to 35 U.S.C. § 119(a) to Japanese Patent Application Nos. 2018-048529, filed on Mar. 15, 2018, and 2019-039154, filed on Mar. 5, 2019 in the Japan Patent Office, the entire disclosure of each of which is hereby incorporated by reference herein.

BACKGROUND

Technical Field

Aspects of the present disclosure relate to an electronic device including a power supply and a method to be executed by the electronic device including the power supply.

Related Art

A universal serial bus (USB) is known as an interface that supplies power from a power supply device to a power receiving device. For example, an electronic device includes a power supply compatible with USB-power delivery (PD). The electronic device compatible with the USB-PD exemplified in JP-2015-176443-A is a dual-role power (DRP) device having a DRP port that enables selective supply and reception of power, and includes a configuration channel (cc) terminal for recognizing connection between DRP devices.

The cc terminal is alternatively connected to a pull-up resistor and a pull-down resistor. In each DRP device, the connection between the cc terminal and the pull-up/pull-down resistor is periodically and alternately switched. Therefore, one DRP device is determined as a source (that is a port having a role of supplying power and having the cc terminal connected to the pull-up resistor), and the other DRP device is determined as a sink (that is a port having a role of receiving the power and having the cc terminal connected to the pull-down resistor) according to timing when the DRP devices are connected via a USB cable.

SUMMARY

In an aspect of the present disclosure, there is provided an electronic device that includes a power supply and a power supply circuit. The power supply circuit is configured to alternately switch a state of the electronic device between a first state to supply power to another device and a second state to receive power from said another device, and stop a switching operation of the state of the electronic device when the electronic device is off, to fix the state of the electronic device to one of the first state and the second state.

In another aspect of the present disclosure, there is provided a method to be executed by an electronic device. The method includes alternately switching a state of the electronic device between a first state to supply power to another device and a second state to receive power from said another device, and stop a switching operation of the state of the electronic device when the electronic device is off, to fix the state of the electronic device to one of the first state and the second state.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a power supply system according to an embodiment of the present invention will be described with reference to the drawings.

Figure 1:
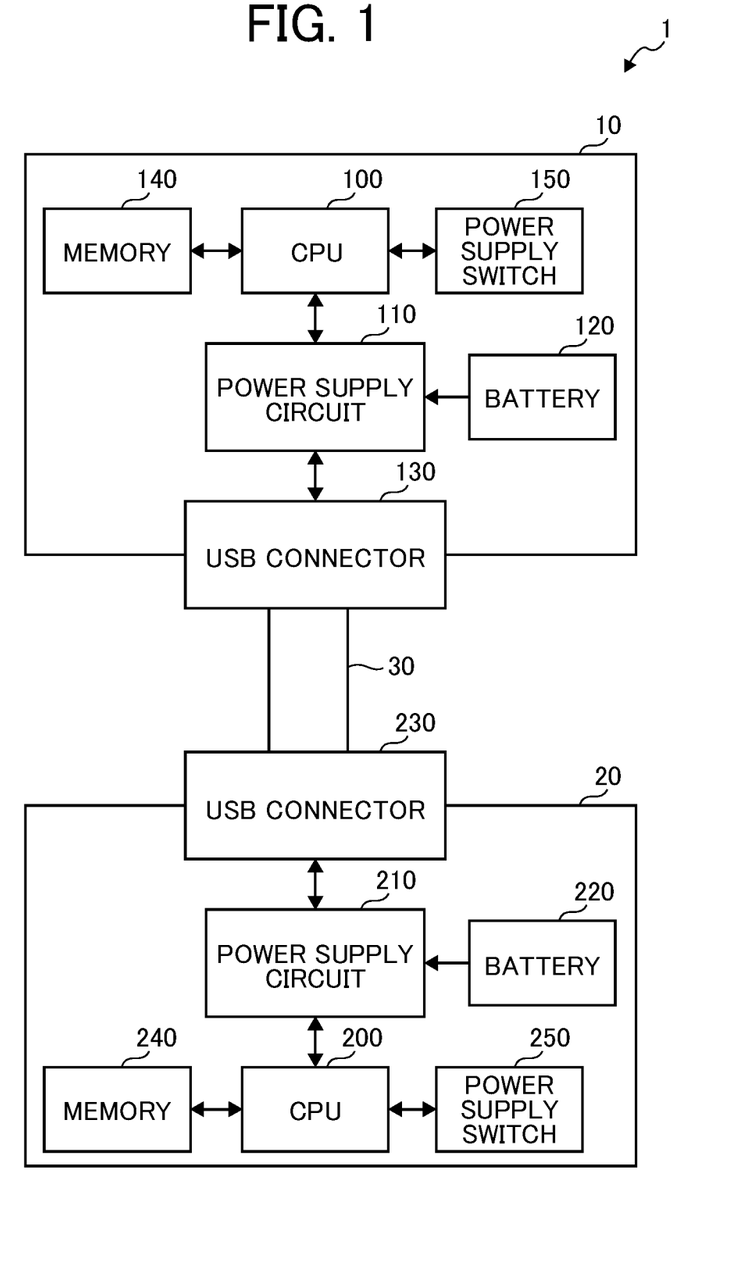
FIG. 1 is a block diagram illustrating a configuration of a power supply system according to an embodiment of the present invention.

FIG. 1 is a block diagram illustrating a configuration of a power supply system 1 according to an embodiment of the present invention. The power supply system 1 includes at least two devices (electronic devices including power supplies). In the example of FIG. 1, the power supply system 1 includes a device 10 and a device 20.

The devices 10 and 20 constituting the power supply system 1 can supply power and receive power according to a result of communication between the devices. That is, the devices 10 and 20 are operable as power supply devices and are illustratively DRP devices each having a DRP port compatible with USB-PD.

Specific examples of the devices 10 and 20 include a digital single lens reflex camera, a mirrorless single lens camera, a compact digital camera, a video camera, a monitoring camera, a camcorder, a desktop personal computer (PC), a notebook PC, a tablet terminal, a personal handy phone system (PHS), a smartphone, a smart watch, a feature phone, a game machine, a music player, a television (TV), various peripherals such as a mobile battery, a projector, a printer, and a storage, and various accessories such as a strobe, a global positioning system (GPS) unit, and an external finder.

Since the devices 10 and 20 are DRP devices, the devices 10 and 20 can serve as sources and sinks. In the present embodiment, for the sake of convenience, a device-specific configuration (for example, a solid-state image pickup device or a photographing lens in the case of a digital single lens reflex camera, a monitor display or a hard disk drive (HDD) in the case of a PC, a flash lamp or a trigger circuit in the case of a strobe, or the like) or a general configuration such as a housing, which allows omission of description, is omitted or simplified as appropriate in illustration and description.

Note that the device 20 may have a function of a source (provider) or a function of a sink (consumer), for example, instead of a DRP device.

As illustrated in FIG. 1, the device 20 includes a central processing unit (CPU) 200, a power supply circuit 210, a battery 220, a USB connector 230, a memory 240, and a power supply switch 250.

When a user presses the power supply switch 150, the power supply circuit 110 supplies power to each part of the device 10. A power supply source to the power supply circuit 110 is, for example, the battery 120 or a commercial power supply. The device 10 basically operates with the power supplied from the battery 120, but when the device 10 is connected to the commercial power supply, the operation is switched to an operation with the power supplied from the commercial power supply.

The CPU 100 accesses the memory 140, reads out a control program, loads the control program in a work area, and executes the loaded control program to comprehensively control the entire device 10.

The USB connector 230 is a connector conforming to the USB-PD standard, and is, for example, a USB Type-C connector. One end of a USB cable 30 is connected to the USB connector 130. The USB cable 30 is a cable conforming to the USB-PD standard, and is, for example, a USB Type-C cable.

As illustrated in FIG. 1, the device 20 includes a CPU 200, a power supply circuit 210, a battery 220, a USB connector 230, a memory 240, and a power supply switch 250. For the device 20, for the sake of convenience, description of portions overlapping with the device 10 is simplified or omitted as appropriate.

The USB connector 230 is a connector conforming to the USB-PD standard, and is, for example, a USB Type-C connector. The other end of the USB cable 30 is connected to the USB connector 230.

In the USB cable 30, a virtual bus ($V_{BUS}$) line connecting a $V_{BUS}$ terminal of the device 10 and a $V_{BUS}$ terminal of the device 20, and a ground (GND) line connecting a GND terminal of the device 10 and a GND terminal of the device 20 are provided as power supply lines. Further, a configuration channel (cc) line for recognizing connection between the devices is provided inside the USB cable 30.

Figure 2:
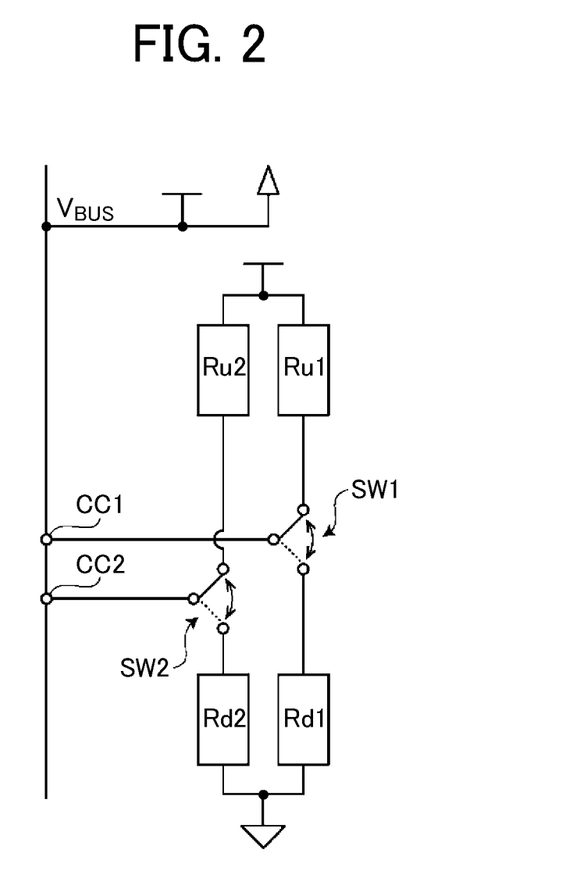
FIG. 2 is a diagram schematically illustrating a configuration around a connecting portion of a device provided in the power supply system according to the embodiment of the present invention.

FIG. 2 schematically illustrates a configuration around a connecting portion of the device 10 connected to the USB cable 30. Specifically, FIG. 2 illustrates the USB connector 130 and a partial circuit (for example, a partial circuit in the power supply circuit 110) in the device 10 located at a rear stage of the USB connector 130. Note that a configuration around a connecting portion of the device 20 as a DRP device is also similarly configured to the device 10. For this reason, illustration of the configuration around the connecting portion of the device 20 is omitted.

Since the USB connector 130 or 230 is a USB Type-C connector, the USB connector 130 or 230 can be reversibly connected in two opposite directions. To enable the reversible connection, each connector of the USB connector 130 or 230 is provided with a pair of cc terminals (a cc1 terminal and a cc2 terminal). When the connectors are connected in one direction, the cc1 terminal of the device 10 and the cc1 terminal of the device 20 are connected via the USB cable 30 (cc line), for example, and when the connectors are connected in the other direction, the cc2 terminal of the device 10 and the cc1 terminal of the device 20 are connected via the cc line, for example. In the devices 10 and 20, the connection direction of the USB connectors 130 and 230 is detected from a combination of the cc terminals connected via the cc line.

The cc1 terminal can be selectively connected to the pull-up resistor Ru1 and the pull-down resistor Rd1. The cc1 terminal is connected to the pull-up resistor Ru1 and the pull-down resistor Ru1 while the power supply and the power reception are not being performed with another electronic device corresponding to the USB-PD (for example, during the period when it is not connected to another electronic device) Is periodically and alternately connected to one of the resistors by the operation of the changeover switch SW1 provided between the resistor Rd1. The cc2 terminal can alternatively be connected to the pull-up resistor Ru2 and the pull-down resistor Rd2 during the above period. The terminal cc2 is cyclically and alternately connected to one of the resistors by the operation of the changeover switch SW2 provided between the pull-up resistor Ru2 and the pull-down resistor Rd2.

Since the connection between the cc terminal and the pull-up/pull-down resistor is periodically and alternately switched in each device, a source (that is a port having a role of supplying power and is a device having the cc terminal connected to the pull-up resistor at this point of time) and a sink (that is a port having a role of receiving power and a device having the cc terminal connected to the pull-down resistor at this point of time) are determined according to timing when the device 10 and the device 20 are connected via the USB cable 30. The source and the sink determined here can be arbitrarily counterchanged.

Supplementarily, when the devices are connected via the cc line, a potential of the cc terminal varies due to voltage division by the pull-up resistor and the pull-down resistor of each device. With the variation of the potential, the device 10 and the device 20 detect the mutual connection and stop switching operations of the changeover switches SW. That is, the device determined as the source maintains the state in which the cc terminal is connected to the pull-up resistor, and the device determined as the sink maintains the state in which the cc terminal is connected to the pull-down resistor.

When the device 10 and the device 20 detect the mutual connection, a power supply voltage (5 V) is supplied from the source to the sink via the $V_{BUS}$ lines. Next, negotiation is performed between the source and the sink. With this negotiation, one profile is selected from among a plurality of profiles (combinations of a voltage suppliable by the source and a maximum current), and setting of the power supply voltage by the $V_{BUS}$ line is changed from 5 V as required according to the selected profile. When the negotiation is completed, 5 V or the power supply voltage after the setting change is supplied from the source to the sink.

As described above, in the DRP device having a conventional configuration, connection of each cc terminal is switched on a steady basis between the pull-up resistor and the pull-down resistor by each changeover switch SW during the period in which no power supply or no power reception is performed to or from another electronic device compatible with the USB-PD (during the period in which the device is not connected with another electronic device, for example). Therefore, in the DRP device having a conventional configuration, the power required for the switching operation of each changeover switch SW is consumed on a steady basis (even when the power is off). Therefore, the device 10 according to the present embodiment suppresses the power consumption when the power supply is off. Four operation examples of the device 10 will be described below.

First Example

Figure 3:
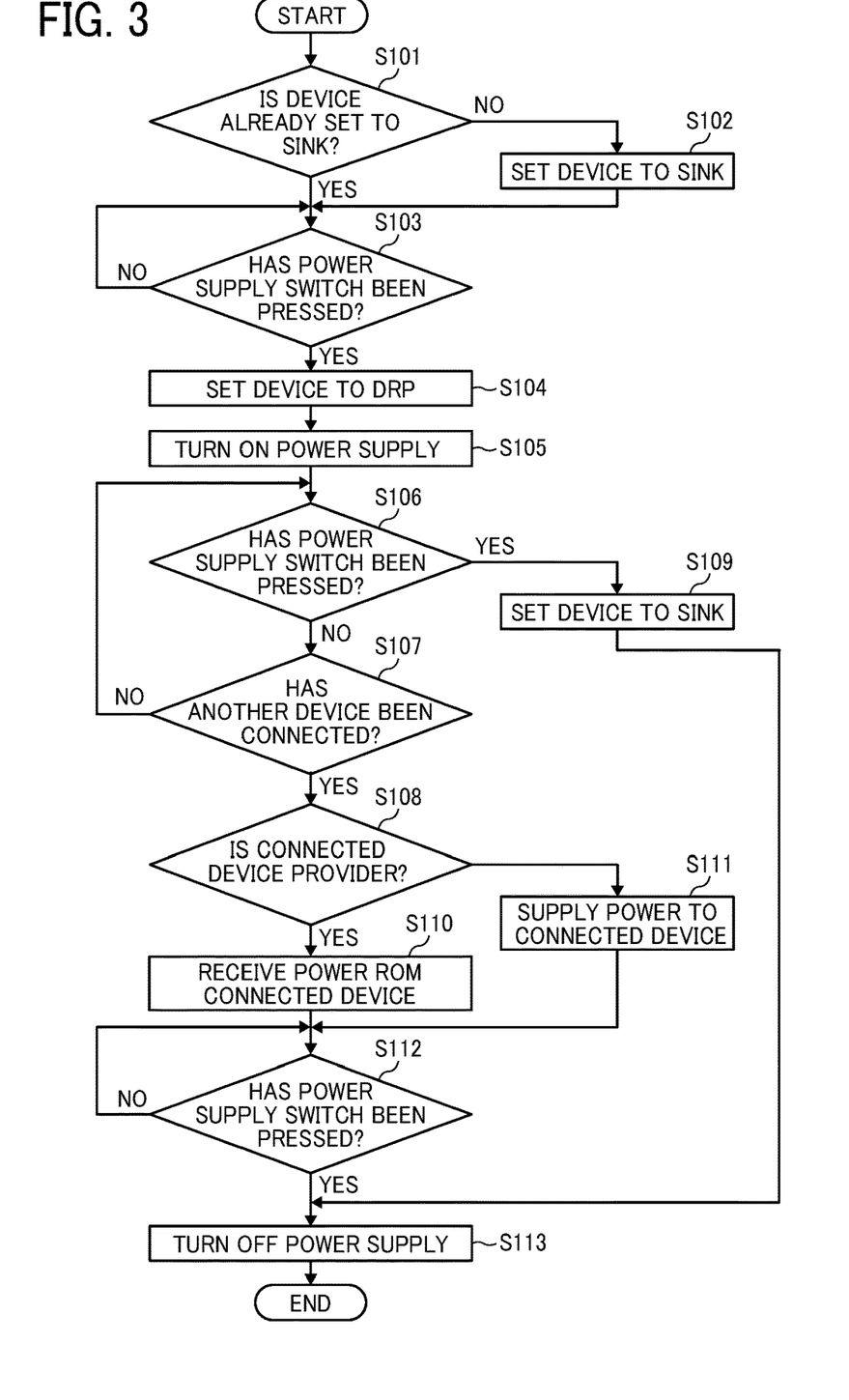
FIG. 3 is a diagram illustrating a flowchart regarding suppression of power consumption executed by the device in a first example of the present invention.

FIG. 3 illustrates a flowchart regarding suppression of power consumption executed by the device 10 (mainly by the power supply circuit 110) in a first example of the present invention. Assume that the device 20 is not connected to the device 10 and the power supply of the device 10 is turned off at the start of the flowchart of the first example.

In the first example, when the device 10 is on standby (with the power supply of the device 10 being turned off), it is determined whether the device 10 is already set to the sink (step S101). When it is determined that the device 10 is not yet set to the sink (step S101: NO), the device 10 is set to the sink (step S102). Specifically, the power supply circuit 110 connects the cc1 and cc2 terminals to the pull-down resistors Rd1 and Rd2, respectively, and stops the operations of the changeover switches SW1 and Sw2 while maintaining the connection state. That is, the power supply circuit 110 operates as fixing means that stops the switching operations of the changeover switches SW1 and Sw2 when the device 10 is turned off, and fixes the state of the device 10 to the state in which the power is receivable from the device 20.

When the device 10 is set to the sink (step S102) or when the device 10 has already been set to the sink (step S101: YES), it is determined whether the power supply switch 150 has been pressed (step S103). When it is determined that the power supply switch 150 has been pressed (step S103: YES), the device 10 is set from the sink to the DRP (step S104). Specifically, the power supply circuit 110 causes the changeover switch SW1 to perform the switching operation so that the cc1 terminal is periodically and alternately connected between the pull-up resistor Ru1 and the pull-down resistor Rd1, and causes the changeover switch SW2 to perform the switching operation so that the cc2 terminal is periodically and alternately connected between the pull-up resistor Ru2 and the pull-down resistor Rd2. That is, the power supply circuit 110 operates as switching means that alternately switches the state of the device 10 to the state in which the power is suppliable to the device 20 (the state in which the cc terminal is connected to the pull-up resistor) and to the state in which the power is receivable from the device 20 (the state in which the cc terminal is connected to the pull-down resistor).

As the power supply switch 150 is pressed and turned on, the power supply of the device 10 is turned on (step S105). That is, the power supply circuit 110 supplies the power to each part of the device 10. With the supply of the power, the system of the device 10 is activated.

When the system of the device 10 is activated, it is determined whether the power supply switch 150 has been pressed (step S106). When it is determined that the power supply switch 150 has not been pressed (step S106: NO), it is determined whether another device (for example, the device 20) has been connected to the device 10 (step S107).

The subsequent processes in this flowchart will be separately described for three cases (cases 1a, 1b, 1c). In the case 1a, a description is given of a case where no device is connected to the device 10 in a period from when the power supply of the device 10 is turned on until the power supply is turned off. In the case 1b, a description is given of a case where a provider is connected to the device 10 in a period from when the power supply of the device 10 is turned on until the power supply is turned off. In the case 1c, a description is given of a case where a consumer is connected to the device 10 in a period from when the power supply of the device 10 is turned on until the power supply is turned off.

[Case 1a]

In the case 1a, since no device is connected to the device 10, the determination of NO in step S106 and the determination of NO in step S107 are repeated. When it is determined that the power supply switch 150 has been pressed (step S106: YES), the device 10 is set from the DRP to the sink (step S109). That is, similarly to step S102, the cc1 and cc2 terminals are connected to the pull-down resistors Rd1 and Rd2, respectively, and the operations of the changeover switches SW1 and Sw2 are stopped while the connection state is maintained.

As the power supply switch 150 is pressed and turned off, the power supply of the device 10 is turned off (step S113). That is, supply of the power to each part of the device 10 by the power supply circuit 110 is stopped. With the stop of the supply of the power, the flowchart illustrated in FIG. 3 is terminated.

As described above, in the case 1a, the switching operation of each changeover switch SW is stopped during a period in which the power supply of the device 10 is off. The power consumption during the power-off is suppressed as compared with the DRP device having a conventional configuration by an amount of stopping the switching operation of each changeover switch SW.

[Case 1b]

In the case 1b, the device 20 is connected to the device 10 before the power supply of the device 10 is turned off. Therefore, in step S107, it is determined that another device has been connected to the device 10 (step S107: YES). Next, it is determined whether the device 20 connected to the device 10 is a provider (step S108).

In the case 1b, the device 20 is set to operate as a source, not as a DRP device. In other words, the device 20 is a provider. When the device 20 is connected to the device 10, the relationship between the device 10 and the device 20 is determined according to the timing when the cc terminal is connected to the pull-down resistor in the device 10. That is, the devices 10 and 20 are determined as the sink and the source, respectively. When the potential of the cc terminal varies due to voltage division by the pull-up resistor and the pull-down resistor of each device and it is determined that another device has been connected to the device 10 (step S107: YES), and the device 20 being another device connected to the device 10 is a provider (step S108: YES), the power supply voltage is supplied from the device 20 as the source to the device 10 operating as the sink via the $V_{BUS}$ line (step S110).

It is determined whether the power supply switch 150 has been pressed (step S112). When it is determined that the power supply switch 150 has been pressed (step S112: YES), the power supply of the device 10 is turned off (step S113). The switching operation of each changeover switch SW remains stopped even after the power supply of the device 10 is turned off. Therefore, the device 10 continues to operate as the sink and continually receives the power from the device 20 as the source. The battery 220 of the device 20 is charged with the power received from the device 10.

Note that the profile may be changed after the power supply switch of the device 10 is turned off or after the power supply of the device 10 is turned off.

As described above, in the case 1 b, the switching operation of each changeover switch SW is also stopped (in the state in which each cc terminal is connected to the pull-down resistor in the case 1b) during the period in which the power supply of the device 10 is off. The power consumption during the power-off is suppressed as compared with the DRP device having a conventional configuration by an amount of stopping the switching operation of each changeover switch SW.

[Case 1c]

In the case 1c, the device 20 is connected to the device 10 before the power supply of the device 10 is turned off. Therefore, in step S107, it is determined that another device has been connected to the device 10 (step S107: YES). Next, it is determined whether the device 20 connected to the device 10 is a provider (step S108).

In the case 1c, the device 20 is set to operate as a sink, not as a DRP device. In other words, the device 20 is a consumer. When the device 20 is connected to the device 10, the relationship between the device 10 and the device 20 is determined according to the timing when the cc terminal is connected to the pull-up resistor in the device 10. That is, the devices 10 and 20 are determined as the source and the sink, respectively. When the potential of the cc terminal varies due to voltage division by the pull-up resistor and the pull-down resistor of each device and it is determined that another device has been connected to the device 10 (step S107: YES), and the device 20 being another device connected to the device 10 is not a provider (step S108: NO), the power supply voltage is supplied from the device 10 operating as the source to the device 20 as the sink via the $V_{BUS}$ line (step S111).

It is determined whether the power supply switch 150 has been pressed (step S112). When it is determined that the power supply switch 150 has been pressed (step S112: YES), the power supply of the device 10 is turned off (step S113). The switching operation of each changeover switch SW remains stopped even after the power supply of the device 10 is turned off. Therefore, the device 10 continues to operate as the sink and continually supplies the power to the device 20 as the sink. Accordingly, the battery 220 of the device 20 is also charged with the power received from the device 10 after the power supply of the device 10 is turned off.

Note that the profile may be changed after the power supply switch of the device 10 is turned off or after the power supply of the device 10 is turned off.

Consider a case in which the connection with the device 20 is released after it is determined that the power supply switch 150 is off (step S112: YES) or after the power supply is turned off (step S113). In this case, the connection of each cc terminal of the device 10 may be maintained at the pull-up resistor or may be changed and maintained from the pull-up resistor to the pull-down resistor.

As described above, in the case 1c, the switching operation of each changeover switch SW is also stopped (in the state in which each cc terminal is connected to the pull-up resistor (or the pull-down resistor) in the case 1c) during the period in which the power supply of the device 10 is off. The power consumption during the power-off is suppressed as compared with the DRP device having a conventional configuration by an amount of stopping the switching operation of each changeover switch SW.

Second Example

Figure 4:
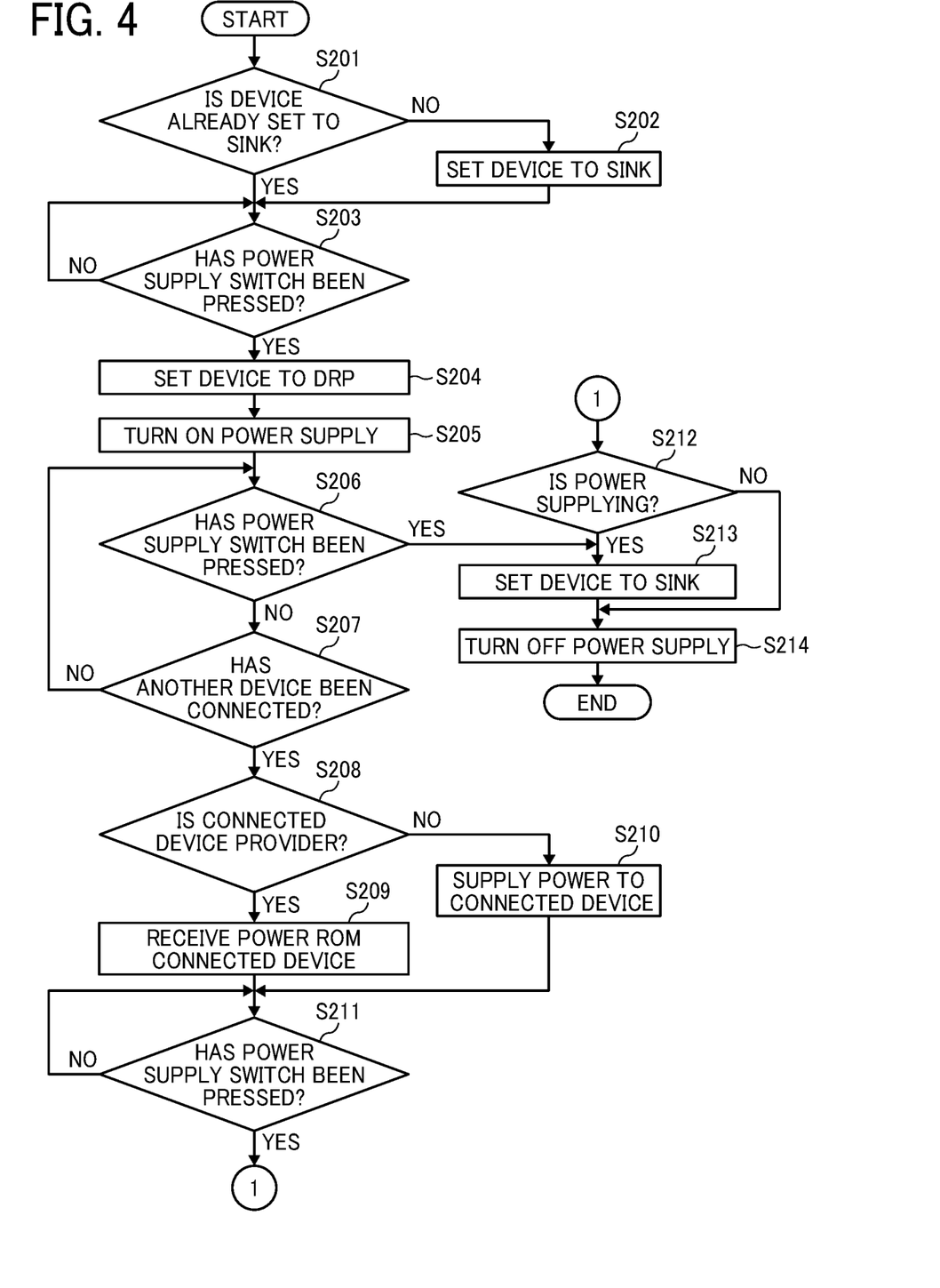
FIG. 4 is a diagram illustrating a flowchart regarding suppression of power consumption executed by the device in a second example of the present invention.

FIG. 4 illustrates a flowchart regarding suppression of power consumption executed by the device 10 in a second example of the present invention. Assume that the device 20 is not connected to the device 10 and the power supply of the device 10 is turned off at the start of the flowchart of the second example, as in the first example. In the following examples, description of parts overlapping with the first example is simplified or omitted as appropriate for the sake of convenience.

In the second example, in a case where no device is connected to the device 10 in a period from when the power supply of the device 10 is turned on until the power supply is turned off, the same processing as in the case 1a of the first example is performed. In the second example, in a case where a provider is connected to the device 10 in the period from when the power supply of the device 10 is turned on until the power supply is turned off, the same processing as in the case 1b of the first example is performed. In the second example, in a case where a consumer is connected to the device 10 in the period from when the power supply of the device 10 is turned on until the power supply is turned off, the same processing as in the case 1c of the first example is performed. Therefore, here, a description is given of a case where a consumer is connected to the device 10 in the period from when the power supply of the device 10 is turned on until the power supply is turned off.

The processing contents of steps S201 to S207 of FIG. 4 are the same as the processing contents of steps S101 to S107 of FIG. 3, respectively.

In the second example, the device 20 is connected to the device 10 before the power supply of the device 10 is turned off. Therefore, in step S207, it is determined that another device has been connected to the device 10 (step S207: YES). Next, it is determined whether the device 20 connected to the device 10 is a provider (step S208).

In the second example, the device 20 is set to operate as a sink, not as a DRP device. In other words, the device 20 is a consumer. When the device 20 is connected to the device 10, the relationship between the device 10 and the device 20 is determined according to the timing when the cc terminal is connected to the pull-up resistor in the device 10. That is, the devices 10 and 20 are determined as the source and the sink, respectively. When the potential of the cc terminal varies due to voltage division by the pull-up resistor and the pull-down resistor of each device and it is determined that another device has been connected to the device 10 (step S207: YES), and the device 20 being another device connected to the device 10 is not a provider (step S208: NO), the power supply voltage is supplied from the device 10 operating as the source to the device 20 as the sink via the $V_{BUS}$ line (step S210).

It is determined whether the power supply switch 150 has been pressed (step S211). When it is determined that the power supply switch 150 has been pressed (step S211: YES), it is determined whether the device 10 is supplying power to the device 20 (step S212). Here, it is determined that the device 10 is supplying power to the device 20 (step S212: YES). In such a case, the device 10 is set to the sink (step S213) to stop power supply from the device 10 to the device 20. That is, the connection of each cc terminal of the device 10 is changed from the pull-up resistor to the pull-down resistor. Then, as the power supply switch 150 is pressed and turned off, the power supply of the device 10 is turned off (step S214).

Note that the profile may be changed after the power supply switch of the device 10 is turned off or after the power supply of the device 10 is turned off.

As described above, in the second example, the switching operation of each changeover switch SW is also stopped (in the state in which each cc terminal is connected to the pull-down resistor in the second example) during the period in which the power supply of the device 10 is off. The power consumption during the power-off is suppressed as compared with the DRP device having a conventional configuration by an amount of stopping the switching operation of each changeover switch SW.

Third Example

Figure 5:
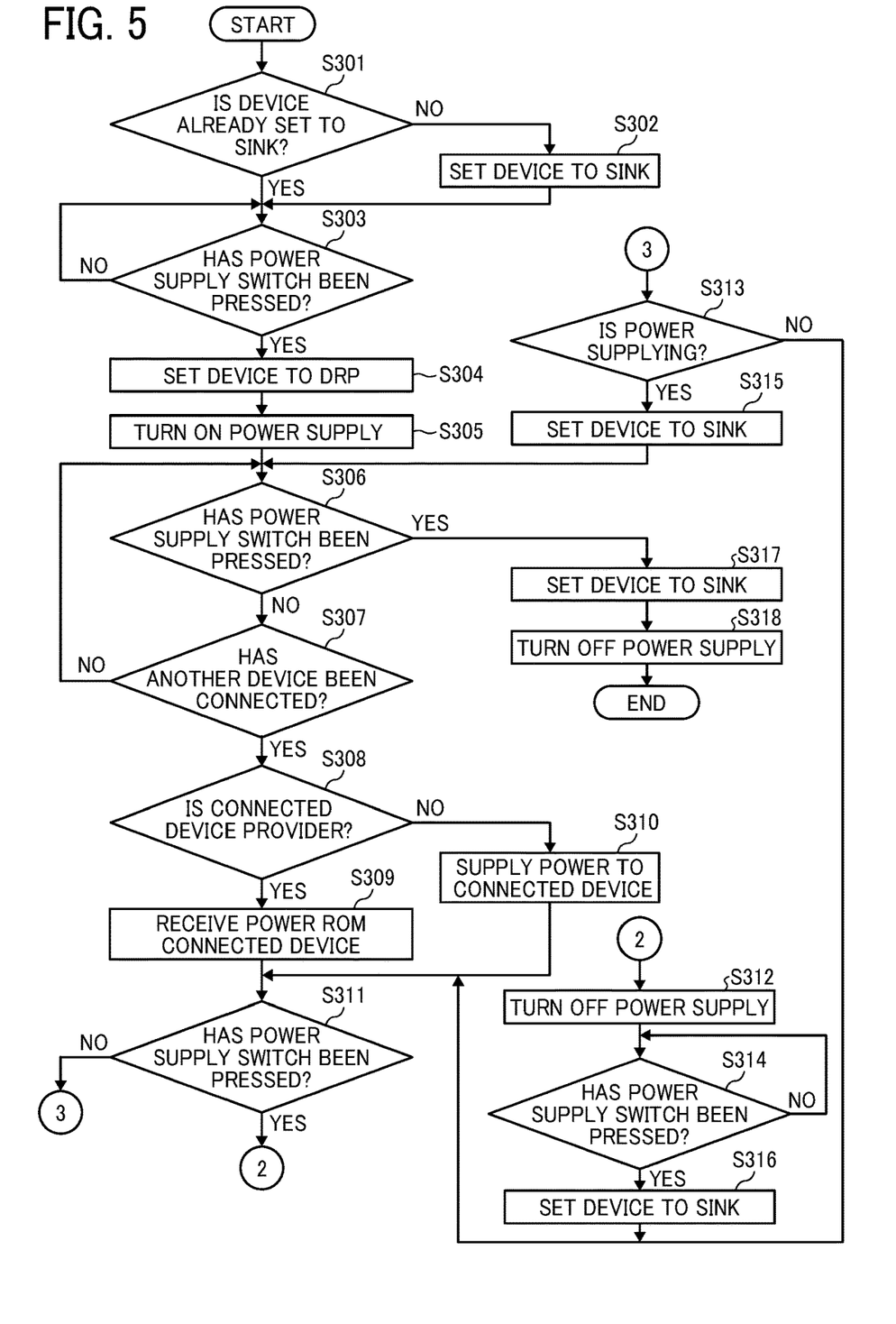
FIG. 5 is a diagram illustrating a flowchart regarding suppression of power consumption executed by the device in a third example of the present invention.

FIG. 5 illustrates a flowchart regarding suppression of power consumption executed by the device 10 in a third example of the present invention. Assume that the device 20 is not connected to the device 10 and the power supply of the device 10 is turned off at the start of the flowchart of the third example, as in the first example.

In the third example, in a case where no device is connected to the device 10 in a period from when the power supply of the device 10 is turned on until the power supply is turned off, the same processing as in the case 1a of the first example is performed. In the third example, in a case where the device 20 (a provider or a consumer) is connected to the device 10 in the period from when the power supply of the device 10 is turned on until the power supply is turned off, different processing from the processing in the case 1b or 1c of the first example is performed. Therefore, here, a case where the provider is connected to the device 10 in the period from when the power supply of the device 10 is turned on until the power supply is turned off is described as a case 3b. A case where a consumer is connected to the device 10 in the period from when the power supply of the device 10 is turned on until the power supply is turned off is described as a case 3c.

The processing contents of steps S301 to S307 of FIG. 5 are the same as the processing contents of steps S101 to S107 of FIG. 3, respectively.

In the third example, the device 20 is connected to the device 10 before the power supply of the device 10 is turned off. Therefore, in step S307, it is determined that another device has been connected to the device 10 (step S307: YES). Next, it is determined whether the device 20 connected to the device 10 is a provider (step S308).

[Case 3b]

In the case 3b, the device 20 is set to operate as a source, not as a DRP device. In other words, the device 20 is a provider. When the device 20 is connected to the device 10, the relationship between the device 10 and the device 20 is determined according to the timing when the cc terminal is connected to the pull-down resistor in the device 10. That is, the devices 10 and 20 are determined as the sink and the source, respectively. When the potential of the cc terminal varies due to voltage division by the pull-up resistor and the pull-down resistor of each device and it is determined that another device has been connected to the device 10 (step S307: YES), and the device 20 being another device connected to the device 10 is a provider (step S308: YES), the power supply voltage is supplied from the device 20 as the source to the device 10 operating as the sink via the $V_{BUS}$ line (step S309). It is determined whether the power supply switch 150 has been pressed (step S311).

When it is determined that the power supply switch 150 has not been pressed (step S311: NO), it is determined whether the connection of the device 20 has been released (step S313).

When it is determined that the power supply switch 150 has been pressed before the connection of the device 20 is released (step S311: YES), the power of the device 10 is turned off while the device 10 is set to the sink (step S312). The switching operation of each changeover switch SW remains stopped even after the power supply of the device 10 is turned off. Therefore, the device 10 continues to operate as the sink and continually receives the power from the device 20 as the source. The battery 220 of the device 20 is charged with the power received from the device 10.

While the device 10 continues to receive power from the device 20, it is also determined whether the power supply switch 150 has been pressed (step S314). When it is determined that the power supply switch 150 has been pressed (step S314: YES), the power supply of the device 10 is turned off (step S316). That is, the power supply circuit 110 supplies the power to each part of the device 10. As a result, the system of the device 10 is restarted, and the determination of the power supply switch 150 (step S311) and the determination of connection release of the device 20 (step S313) are repeated.

In step S313, when it is determined that the connection of the device 20 has been released (step S313: YES), the device 10 is set to the DRP device (step S315). If the device 10 is already set to the DRP device, the setting is maintained. Next, the determination of the power supply switch 150 (step S306) and the connection determination of the device 20 (step S307) are repeated until the power supply switch 150 is turned off.

When it is determined that the power supply switch 150 has been pressed (step S306: YES), the device 10 is set from the DRP to the sink (step S317). That is, the cc1 and cc2 terminals are connected to the pull-down resistors Rd1 and Rd2, respectively, and the operations of the changeover switches SW1 and Sw2 are stopped while the connection state is maintained.

As the power supply switch 150 is pressed and turned off, the power supply of the device 10 is turned off (step S318). That is, supply of the power to each part of the device 10 by the power supply circuit 110 is stopped. With the stop of the supply of the power, the process illustrated in the flowchart of FIG. 5 is terminated.

As described above, in the case 3b, the switching operation of each changeover switch SW is also stopped during a period in which the power supply of the device 10 is off. The power consumption during the power-off is suppressed as compared with the DRP device having a conventional configuration by an amount of stopping the switching operation of each changeover switch SW.

[Case 3c]

In the case 3c, the device 20 is set to operate as a sink, not as a DRP device. In other words, the device 20 is a consumer. When the device 20 is connected to the device 10, the relationship between the device 10 and the device 20 is determined according to the timing when the cc terminal is connected to the pull-up resistor in the device 10. That is, the devices 10 and 20 are determined as the source and the sink, respectively. When the potential of the cc terminal varies due to voltage division by the pull-up resistor and the pull-down resistor of each device and it is determined that another device has been connected to the device 10 (step S307: YES), and the device 20 being another device connected to the device 10 is not a provider (step S308: NO), the power supply voltage is supplied from the device 10 operating as the source to the device 20 as the sink via the $V_{BUS}$ line (step S310).

Since the subsequent processing is the same as the case 3b, descriptions thereof are omitted.

As described above, in the case 3c, the switching operation of each changeover switch SW is also stopped during a period in which the power supply of the device 10 is off. The power consumption during the power-off is suppressed as compared with the DRP device having a conventional configuration by an amount of stopping the switching operation of each changeover switch SW.

The above is description of the illustrative embodiments of the present invention. The embodiments of the present invention are not limited to those described above, and various modifications can be made within the scope of the technical idea of the present invention. For example, appropriate combinations of the embodiments and the like clearly exemplified in the specification or obvious embodiments are also included in the embodiments of the present application. Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

In the above-described embodiment (for example, the first example), the device 10 is set to the DRP device in the period from when the power supply switch 150 is turned on to when the power supply is turned on. Note that, in some embodiments, the device 10 may be set to the DRP device after the power supply is turned on.

In the above-described embodiment (for example, the case 1a of the first example), the device 10 is set to the sink in the period from when the power supply switch 150 is turned off to when the power supply is turned off. Note that, in some embodiments, the device 10 may be set to the sink after the power supply is turned off.

In the above-described embodiment (for example, the case 1b of the first example), the processing of turning on the power supply of the device 10 before the device 20 is connected has been described. Note that, in some embodiments, the device 20 may be connected before the power supply of the device 10 is turned on. In such a case, when the device 20 is set to operate as only a source, processing of setting the device to DRP (for example, step S104) may be omitted and the device 10 may receive power from the device 20.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electronic device, comprising:
   a power supply; and
   a power supply circuit configured to
      perform a switching operation of periodically and alternately switching a state of the electronic device between a first state to supply power to a particular device and a second state to receive power from the particular device; and
      in response to a power supply switch being switched off al a time when the power supply circuit is supplying power to the electronic device and the switching operation is being performed, stop performing the switching operation of the state of the electronic device, so as to fix the state of the electronic device to one of the first state and the second state, even when the electronic device is not connected to the particular device.

2. The electronic device according to claim 1,
   wherein the power supply circuit is further configured to alternately switch the state of the electronic device between the first state and the second state during a period in which the electronic device is not connected to the particular device and the power supply circuit is supplying power to the electronic device.

3. The electronic device according to claim 2, wherein the power supply circuit is further configured to
   determine the state of the electronic device as one of the first state and the second state when the electronic device is connected to the particular device, and
   continue the state of the electronic device as the first state after the power supply switch of the electronic device is switched off, when the state of the electronic device is determined as the first state.

4. The electronic device according to claim 2, wherein the power supply circuit is further configured to
   determine the state of the electronic device as one of the first state and the second state when the electronic device is connected to the particular device, and
   change the state of the electronic device from the first state to the second state after the power supply switch of the electronic device is switched off, when the state of the electronic device is determined as the first state.

5. The electronic device according to claim 2, wherein the power supply circuit is further configured to
   determine the state of the electronic device as one of the first state and the second state when the electronic device is connected to the particular device, and
   continue the state of the electronic device as the second state after the power supply switch of the electronic device is switched off, when the state of the electronic device is determined as the second state.

6. The electronic device according to claim 2,
   wherein the power supply circuit is further configured to maintain the state of the electronic device at a current state, out of the first state and the second state, when the electronic device is connected to the particular device and the connection to the particular device is released.

7. A method executed by an electronic device, the method comprising:

performing a switching operation of periodically and alternately switching a state of the electronic device between a first state to supply power to a particular device and a second state to receive power from the particular device; and in response to a power supply switch being switched off at a time when power is being supplied to the electronic device and the switching operation is being performed, stop performing the switching operation of the state of the electronic device, so as to fix the state of the electronic device to one of the first state and the second state, even when the electronic device is not connected to the particular device.

8. An electronic device, comprising:

a power supply; and a power supply circuit configured to perform a switching operation of periodically and alternately switching a state of the electronic device between a first state to supply power to a particular device and a second state to receive power from the particular device during a period in which the electronic device is not connected to the particular device and the power supply circuit is supplying power to the electronic device;

determine the state of the electronic device as one of the first state and the second state when the electronic device is connected to the particular device, and continue the state of the electronic device as the first state after the power supply switch of the electronic device is switched off, when the state of the electronic device is determined as the first state.

9. The electronic device of claim 8, wherein the power supply circuit is further configured to continue the state of the electronic device as the second state after the power supply switch of the electronic device is switched off, when the state of the electronic device is determined as the second state.

10. The electronic device of claim 1, wherein the power supply circuit is further configured to stop performing the switching operation prior to turning off the power supply to the electronic device.

* * * * *